June 13, 1933.  L. K. SPINK  1,913,860
MEASURING THE FLOW OF FLUID
Filed April 18, 1928

Inventor:
Leland K. Spink
by Emery, Booth, Janney & Varney
Attys

Patented June 13, 1933

1,913,860

UNITED STATES PATENT OFFICE

LELAND K. SPINK, OF TULSA, OKLAHOMA, ASSIGNOR TO THE FOXBORO COMPANY, OF FOXBORO, MASSACHUSETTS, A CORPORATION OF MASSACHUSETTS

MEASURING THE FLOW OF FLUID

Application filed April 18, 1928. Serial No. 271,080.

This invention relates to the measurement of the flow of compressible fluids by means of orifice meters, Venturi meters, Pitot meters and the like, and the object is to provide a simple method and apparatus whereby accurate measurement may be obtained of the flow of fluid under varied heads or pressures.

Figure 1:
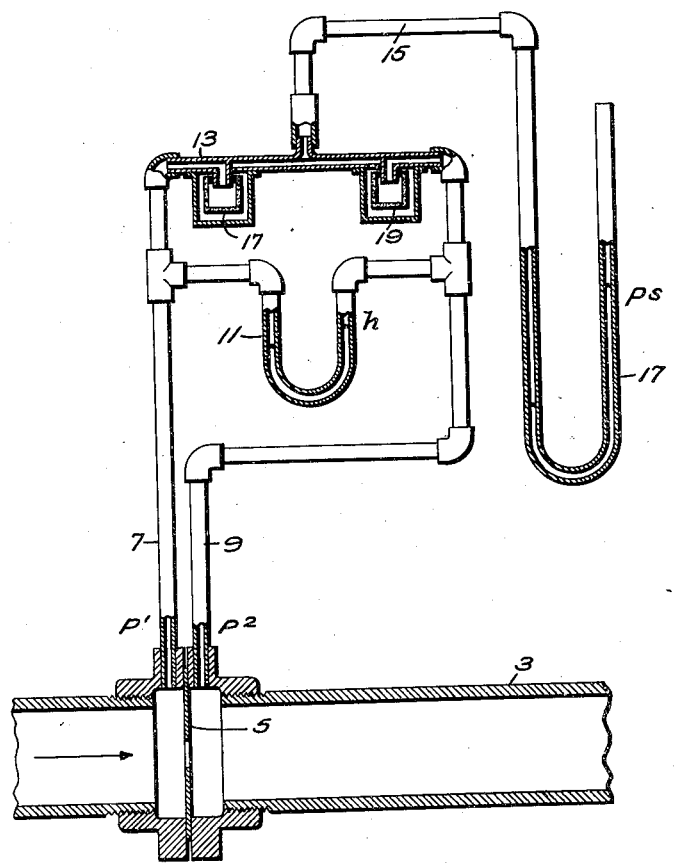
Figure 2:
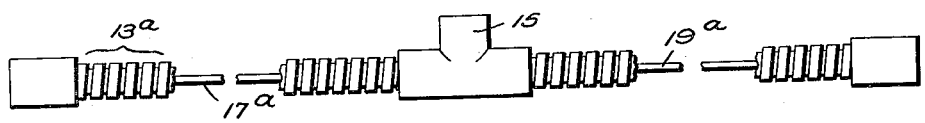

My invention will be well understood by reference to the following description of illustrative embodiments of an apparatus whereby the desired results may be obtained and wherein:

Fig. 1 is a diagrammatic view, partially in section, showing an orifice meter installation; and Fig. 2 is a broken view on an enlarged scale of a modified mechanism which may be substituted for a part of that shown in Fig. 1.

Referring to the drawing, I have there shown a pipe line in which is an orifice plate 5, such, for example, as that shown in the patent to Weymouth No. 1,206,185, Nov. 28, 1916. Pressure taps 7 and 9 on the upstream and downstream sides of the orifice plate respectively permit the measurement of the pressure drop across the orifice in well known manner, this being indicated herein by the diagrammatic showing of a U-tube gage 11 with the legs of which the taps 7 and 9 communicate. As is well known, the flow in pipe line 3 may be calculated from the equation $Q = K\sqrt{hP}$ where $h$ is the differential in pressure across the orifice, usually measured in inches of water, P is the static pressure in pounds per square inch absolute, usually measured on the downstream side of the orifice, and K is considered as a constant and is denominated the efficiency of the particular orifice plate in use.

The efficiency of the orifice is determined by experiment. It has been found that when the density of the gas is determined by the use of the pressure $P_1$ on the upstream side of the orifice, the efficiency of the orifice drops as the differential $h$ increases, and similarly when the density is determined by the pressure $P_2$ at the downstream side of the orifice, the efficiency of the orifice increases when the differential increases.

It is obviously desirable that the efficiency of the orifice should remain constant, that is, that K in the equation referred to should be a constant within the limits of accuracy demanded by the use to which the meter is put. Experiments have shown that a pressure $P_s$ can be so chosen between $P_1$ and $P_2$ that such a constant efficiency may be maintained. The magnitude of this pressure may be expressed as a function of $(P_1 - P_2)$ added to $P_2$. The function depends upon the ratio of specific heats of the gases or their compressibility. For cases met in commercial practice I may write algebraically $P_s = P_2 + C(P_1 - P_2)$ and again for the cases met in commercial practice the coefficient C is between .5 and .6.

To permit of the practical utilization of these facts a pressure may be created which is intermediate between the pressures $P_1$ and $P_2$ and which satisfies the equation just given, and this pressure may be measured and used in connection with the differential pressure in the customary formula for calculating the rate of flow in the pipe line. In the embodiment of my invention herein illustrated this intermediate pressure is derived from the high and low pressures set up by the orifice plate 5 and for this purpose a small quantity of the gas may be by-passed, as by the by-pass conduit 13 connecting the pressure taps 7 and 9, between the high and low pressure sides of the orifice, thus creating a pressure gradient between these two regions of pressure and at a suitably chosen intermediate point in the by-pass a branch connection 15 may be made to a device (diagrammatically illustrated as a mercury U-tube 17) by means of which the intermediate pressure $P_s$ may be measured.

The by-pass connection 13 may embody on either side of the branch 15 suitable retarding devices controlling the pressure drop, and I have herein shown at either side of such branch porous ceramic cups 17 and 19 through which the gas flows. The pressure at the branch 15 may be determined by the relative resistance of the retarding devices. Thus, if the two cups 17 and 19 are of equal resistance, the pressure $P_s$ between them will be an arithmetical mean between the high and low pressures $P_1$ and $P_2$ respectively, giving the factor .5 referred to above, or, if the factor .6 is desired, the ratio of the resistance of 17 to that of 19 may be as 6 is to 4.

When, as in the illustrated example, the differential pressure from which the term $(P_1-P_2)$ is derived is that utilized as a factor in the measuring equation, the quantity of gas diverted through the by-pass 13 should be very small, as, for instance, not more than .1% of the total flow through the orifice. In other words, the gas diverted, not being measured, should not exceed in quantity the permissible percentage of error in the measuring apparatus. Also, the major quantity of the gas flows from the orifice to determine the high and low pressures $P_1$ and $P_2$ so as to establish a pressure gradient in the by-pass flowing between them, the pressure drop being from $P_1$ to $P_2$ and the flow through the by-pass varying directly as the pressure drop.

In Fig. 2, I have shown a modified form of by-pass connection 13a comprising two lengths 17a and 19a of tubing of substantially capillary bore between which is interposed the tap 15 to measure the intermediate pressure. The ratio of the length of tube 17a to tube 19a will determine the value of the factor C determining the value of pressure $P_s$ measured at the point 15.

The devices described are both cheap and simple, and not only may be readily organized in connection with metering mechanisms of known type, but the by-pass connections may be designed and built as units complete in themselves and easily installed as an addition to or change in existing standard metering installations already in use.

I have described in detail specific embodiments of my invention and indicated the principle on which they operate. The features of novelty exemplified thereby, which I claim as new and desire to secure by Letters Patent, I shall express in the following claims.

1. A method of obtaining data for calculation of the rate of flow of a stream of fluid which comprises locally restricting the flow of the stream to create a pressure drop therein, determining the differential pressure created thereby, establishing a pressure gradient of substantially constant character between the regions of high and low pressure and determining the pressure at an intermediate point therealong.

2. A method of determining a static pressure for use in calculating the rate of flow of a stream of fluid in connection with the differential pressure created therein by a suitable metering device which comprises by-passing a small portion of the fluid between the high and low pressure regions through retarding devices of predetermined ratio and measuring the static pressure thereof at a point between such devices.

3. In combination with a metering device of the type acting to establish a differential pressure and the means for measuring the differential pressure created thereby, means for establishing a pressure gradient between the up and down stream sides of said device and means cooperating therewith for measuring the pressure at an intermediate point in said gradient.

4. In combination with a metering device of the type acting to establish a differential pressure and the means for measuring the differential pressure created thereby, a connection around said device adapted to by-pass a small portion of the fluid not sufficient substantially to affect the volume of the stream and means for measuring the pressure at an intermediate point of the stream so diverted.

5. In combination with a metering device of the type acting to establish a differential pressure and the means for measuring the differential pressure created thereby, a connection around said device adapted to by-pass a small portion of the fluid flowing through said device and including retarding mechanisms of predetermined ratio and a pressure measuring means between said mechanisms.

6. In combination with a metering device of the type acting to establish a differential pressure and the means for measuring the differential pressure created thereby, a connection around said device adapted to by-pass a small portion of the fluid flowing through said device and including a pair of pervious barriers through which said portion must flow and a pressure measuring means between said barriers.

7. In combination with a metering device of the type acting to establish a differential pressure and the means for measuring the differential pressure created thereby, a connection around said device adapted to by-pass a small portion of the fluid flowing through said device and including porous ceramic walls through which said portion must flow and means for measuring the pressure at a point between successive walls.

8. In combination with a metering device of the type acting to establish a differential pressure and the means for measuring the differential pressure created thereby, a connection around said device adapted to by-pass a small portion of the fluid flowing through said device and including porous cups through which said portion must flow and means for measuring the pressure at a point between successive cups.

9. In combination with a device acting to establish a differential pressure in a stream of fluid for metering the flow thereof in combination with means for measuring the differential of pressure created thereby, means to establish a pressure which is the mean of the high and low pressures of said differential and means to measure the said mean pressure.

10. In combination with a device acting to establish a differential pressure in a stream of fluid for metering the flow thereof in combination with means for measuring the differential of pressure created thereby, means to establish a pressure exceeding the low pressure of said pressure differential by a determined fractional part of said differential and means to measure the pressure so established.

11. In combination with a device associated with a fluid conduit to establish a differential pressure in the stream of fluid consequent on the flow therein, means to measure such differential pressure, a passage connecting the regions of high and low pressure constructed and arranged to permit a flow of substantially constant character therethrough of a small quantity of fluid not sufficient substantially to affect the volume of the stream and a pressure-measuring means connected at an intermediate point thereto.

12. In combination with a fluid conduit, an apparatus associated therewith to set up a high and a low pressure defining a differential consequent on the flow of fluid in the conduit, means to measure such differential, said apparatus including a passage between the high and low pressure sides thereof adapted to pass a small quantity of fluid not sufficient substantially to affect the volume of the stream, which passage establishes a pressure gradient of substantially constant character between the same and a pressure-measuring means connected at an intermediate point thereto.

13. In an orifice meter, the combination of a pipe line having a restriction in the line; a gauge responsive to line pressures indicating the differential pressure between the up-stream and down-stream sides of the restriction, means connecting the pressure gauge to the pipe at each side of said restriction; and means operable by line pressures and adapted to indicate indicating a line pressure at one side of the restriction qualified by a percentage of the differential pressure, said means comprising a bypass around the restriction and two spaced resistance elements in the bypass, said elements varying in resistance directly as their dimensions, and means indicating the pressure between the elements, the element at the up-stream side having the greater resistance.

14. In an orifice meter, the combination of a pipe line having a restriction in the line; a gauge responsive to line pressures indicating the differential pressure between the up-stream and down-stream sides of the restriction, means connecting the pressure gauge to the pipe at each side of said restriction; and means operable by line pressures and adapted to indicate a line pressure at one side of the restriction qualified by a percentage of the differential pressure, said means comprising a bypass around the restriction and spaced capillary tubes of the same diameter in the bypass and means indicating the pressure between said capillary tubes.

15. In an orifice meter, the combination of a pipe line having a restriction in the line; a gauge responsive to line pressures indicating the differential pressure between the up-stream and down-stream sides of the restriction, means connecting the pressure gauge to the pipe at each side of said restriction; and means operable by line pressures and adapted to indicate a line pressure at one side of the restriction qualified by a percentage of the differential pressure, said means comprising a bypass around the restriction and spaced capillary tubes of the same diameter in the bypass and the relative lengths corresponding to the percentage and means indicating the pressure between said capillary tubes.

16. In an orifice meter, the combination of a pipe line having a restriction in the line; a gauge responsive to line pressures indicating the differential pressure between the up-stream and down-stream sides of the restriction, means connecting the pressure gauge to the pipe at each side of said restriction; means operable by line pressures and adapted to indicate a line pressure at one side of the restriction qualified by a percentage of the differential pressure, said means comprising a bypass around the restriction and two spaced resistance elements in the bypass, said elements varying in resistance directly as their dimensions, and indicating means connected between the elements.

In testimony whereof, I have signed my name to this specification.

LELAND K. SPINK.

CERTIFICATE OF CORRECTION.

Patent No. 1,913,860. June 13, 1933.

LELAND K. SPINK.

It is hereby certified that error appears in the printed specification of the above numbered patent requiring correction as follows: Page 3, line 50, claim 13, strike out the word "indicating"; and that the said Letters Patent should be read with this correction therein that the same may conform to the record of the casein the Patent Office.

Signed and sealed this 15th day of August, A. D. 1933.

M. J. Moore.

(Seal) Acting Commissioner of Patents.